(12) United States Patent
Oh (10) Patent No.: US 10,035,486 B2
(45) Date of Patent: Jul. 31, 2018

(54) AIRBAG EQUIPPED WITH SUB-CHAMBER

(71) Applicant: Hyundai Motor Company, Seoul (KR)

(72) Inventor: Chang Jin Oh, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/334,222

(22) Filed: Oct. 25, 2016

(65) Prior Publication Data

US 2018/0009405 A1 Jan. 11, 2018

(30) Foreign Application Priority Data

Jul. 5, 2016 (KR) .................. 10-2016-0084961

(51) Int. Cl.
| | | |
|---|---|---|
| *B60R 21/233* | (2006.01) | |
| *B60R 21/239* | (2006.01) | |
| *B60R 21/231* | (2011.01) | |
| B60R 21/26 | (2011.01) | |

(52) U.S. Cl.
CPC .......... *B60R 21/233* (2013.01); *B60R 21/231* (2013.01); *B60R 21/239* (2013.01); *B60R 2021/23324* (2013.01); *B60R 2021/23332* (2013.01); *B60R 2021/26058* (2013.01)

(58) Field of Classification Search
CPC ... B60R 21/233; B60R 21/231; B60R 21/239; B60R 2021/23332; B60R 2021/26058; B60R 2021/23324
See application file for complete search history.

(56) References Cited

U.S. PATENT DOCUMENTS

| | | | |
|---|---|---|---|
| 2014/0265278 A1 | 9/2014 | Anderson et al. | |
| 2015/0158452 A1* | 6/2015 | Choi | B60R 21/233 280/732 |
| 2015/0166002 A1* | 6/2015 | Fukawatase | B60R 21/233 280/730.1 |
| 2015/0258959 A1* | 9/2015 | Belwafa | B60R 21/233 280/729 |
| 2015/0343986 A1* | 12/2015 | Schneider | B60R 21/205 280/729 |
| 2016/0046257 A1* | 2/2016 | Yamada | B60R 21/2338 280/729 |
| 2016/0059817 A1* | 3/2016 | Umehara | B60R 21/233 280/729 |
| 2017/0282841 A1* | 10/2017 | Hayashi | B60R 21/239 |

FOREIGN PATENT DOCUMENTS

| | | |
|---|---|---|
| JP | 2000-153746 A | 6/2000 |
| JP | 2012-153338 A | 8/2012 |
| KR | 10-2010-0089666 A | 8/2010 |
| KR | 10-2013-0083264 A | 7/2013 |
| KR | 10-2016-0009967 A | 1/2016 |
| WO | WO 2015/187300 A2 | 12/2015 |

* cited by examiner

*Primary Examiner* — Drew J Brown
(74) *Attorney, Agent, or Firm* — Morgan, Lewis & Bockius LLP (57) ABSTRACT

An airbag equipped with a sub-chamber may include a main chamber expanding by being injected with gas in a collision, and a sub-chamber formed by folding a panel-shaped chamber to be combined with the main chamber and have self-supporting force, the sub-chamber assisting supporting force of the main chamber by expanding with the main chamber.

11 Claims, 10 Drawing Sheets

AIRBAG EQUIPPED WITH SUB-CHAMBER

CROSS REFERENCE TO RELATED APPLICATION

The present application claims priority to Korean Patent Application No. 10-2016-0084961, filed Jul. 5, 2016, the entire contents of which is incorporated herein for all purposes by this reference.

BACKGROUND OF THE INVENTION

Field of the Invention

The present invention relates to an automotive airbag and, more particularly, to an airbag equipped with a sub-chamber for preventing damage to the head of a passenger due to rotation of the passenger's head and collapse of the airbag cushion of a front airbag in an oblique collision.

Description of Related Art

In general, vehicles are equipped with various devices for protecting passengers to keep the passengers safe in collisions, and a seat belt and an airbag are representative of the devices.

In those devices for protecting passengers, the airbag in particular, in cooperation with the seat belt, is a device for preventing a portion of the passenger's body such as the head, the chest, and the knees from being injured by hitting against the vehicle body or a structure in a vehicle in a collision.

Such an airbag is mounted usually ahead of the front seats, that is, the driver seat and the passenger seat and can be generally classified into a driver airbag that is mounted on a steering wheel and a passenger airbag disposed on a glove box or in an upper crash pad.

The front airbags that are disposed ahead of the front seats are injected with gas from an inflator to protect passengers in a collision.

However, these airbags have a problem that when a passenger is turned in an oblique collision or an offset collision, the airbag cushions that are supposed to support the passenger collapse and the passenger's body hits against vehicle body or a structure in a vehicle outside of the coverage of the chamber of the airbag, so the passenger's head, etc. may be seriously injured.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an airbag equipped with a sub-chamber for preventing injury to the passenger's body by supporting the passenger to prevent the passenger from turning in an oblique collision.

According to various aspects of the present invention, an airbag equipped with a sub-chamber may include a main chamber expanding by being injected with gas in a collision, and a sub-chamber formed by folding a panel-shaped chamber to be combined with the main chamber and have self-supporting force, the sub-chamber assisting supporting force of the main chamber by expanding with the main chamber.

The sub-chamber may be coupled to side parts of the main chamber to increase side supporting force of the main chamber and support a passenger turning in a collision.

The main chamber and the sub-chamber may each include an inflator, and the main chamber and the sub-chamber may simultaneously expand via respective inflators and support a passenger in a collision.

Vents may be formed through a side of the main chamber and gas injection holes are formed at positions corresponding to the vents in the sub-chamber, gas may be supplied into the sub-chamber through the vents when gas is injected into the main chamber, the gas may be supplied into the sub-chamber through the vents.

The sub-chamber may be coupled to the main chamber to turn at a predetermined angle with respect to the main chamber so that a folded portion of the sub-chamber supports a passenger.

The sub-chamber may be folded and coupled to the main chamber and may have an M-shape when completely expanded in a collision.

The sub-chamber may be formed as a rectangle having a width larger than a height thereof and may include the front part and the rear part, the front part and the rear part may be sewn at upper and lower portions and include a plurality of vertical seams having a predetermined length, both sides and a center of the sub-chamber may be coupled to sides of the main chamber, and the sub-chamber may fully expand in an M-shape.

The sub-chamber may be folded and coupled to the main chamber, may have an M-shape when completely expanded in a collision, both ends of the M-shape may be coupled to the side part of the main chamber, and a bending portion of the M-shape may face outside from the main chamber.

The sub-chamber may be folded and coupled to the main chamber and have a C-shape when completely expanded in a collision.

The sub-chamber may be folded and coupled to the main chamber and have a U-shape when completely expanded in a collision.

The sub-chamber may be coupled to the main chamber to further protrude by a predetermined distance toward a passenger than toward the main chamber when the main chamber and the sub-chamber expand A pair of head protection chambers for protecting the head of a passenger may be formed in the main chamber.

According to the airbag equipped with a sub-chamber of various embodiments of the present invention, since a panel-shaped sub-chamber is folded to have self-supporting force and is then coupled to the side parts of the main chamber, it is possible to enlarge the coverage of the airbags only with the current inflator even without increasing the volume of the main chamber.

In particular, even if a passenger is moved to a corner in an oblique or offset collision, the main chamber does not collapse, so it is possible to more stably support the passenger.

Further, the panel-shaped chamber can be achieved in various shapes in accordance with the ways of sewing and folding and the coupling angle, so it is possible to additionally ensure supporting force.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
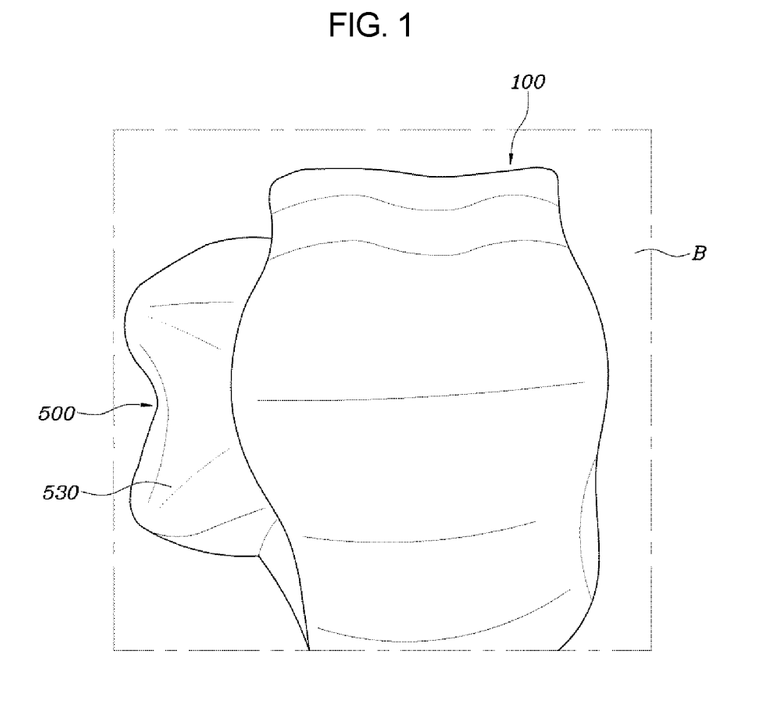
FIG. 1 is a view showing an airbag equipped with a sub-chamber according to various embodiments of the present invention.
Figure 2:
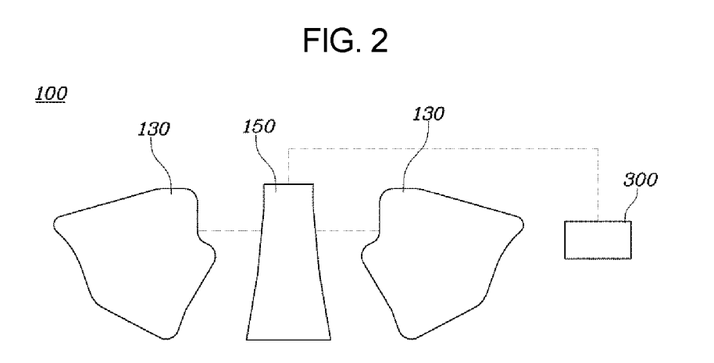
FIG. 2 is an exploded perspective view of a main chamber.
Figure 3:
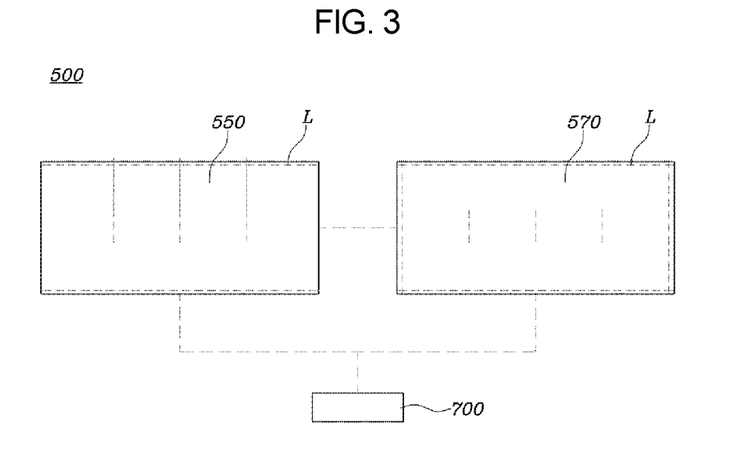
FIG. 3 is an exploded perspective view of a sub-chamber.
Figure 4:
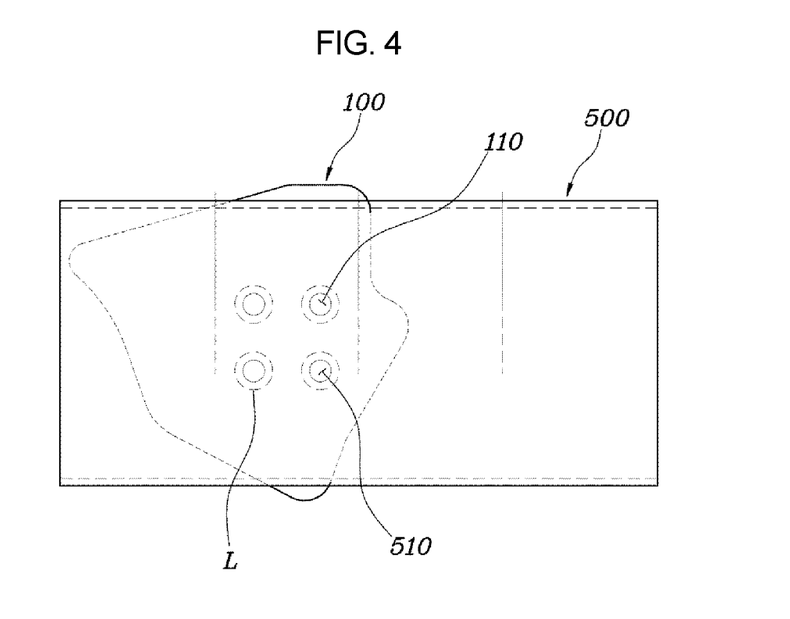
FIG. 4 is a side perspective view after the main chamber and the sub-chamber are combined.
Figure 5:
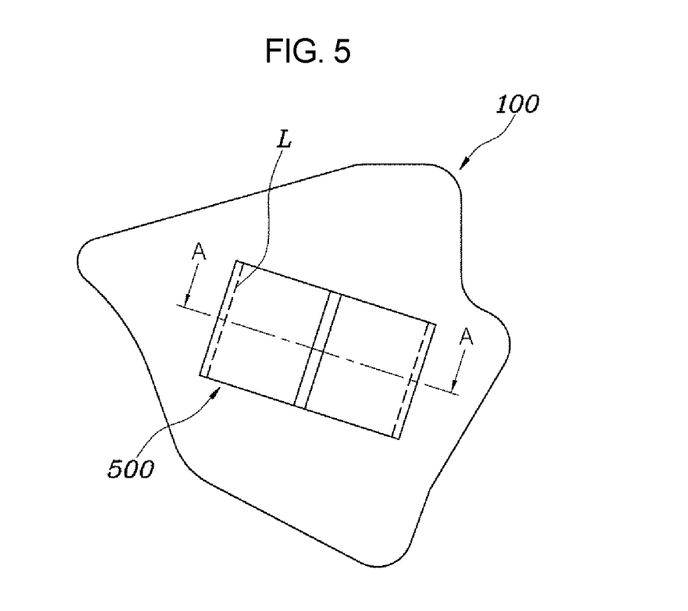
FIG. 5 is a view showing an assembly of the main chamber and the sub-chamber.
Figure 6:
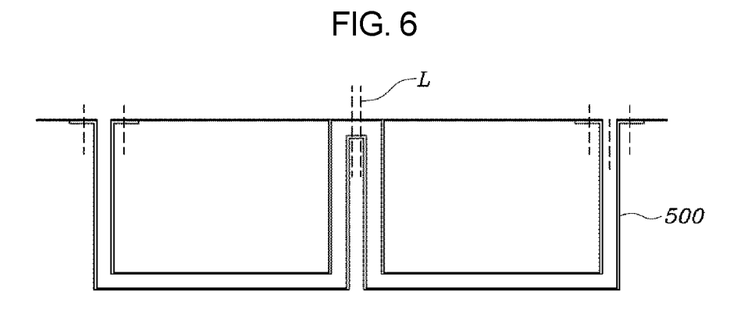
FIG. 6 is a cross-sectional view taken along line A-A of FIG. 5.

FIG. 1 is a view showing an airbag equipped with a sub-chamber according to various embodiments of the present invention, FIG. 2 is an exploded perspective view of a main chamber 100, and FIG. 3 is an exploded perspective view of a sub-chamber 500. Further, FIG. 4 is a side perspective view after the main chamber 100 and the sub-chamber 500 are combined, FIG. 5 is a view showing an assembly of the main chamber 100 and the sub-chamber 500, and FIG. 6 is a cross-sectional view taken along line A-A of FIG. 5.

As shown in FIG. 1, an airbag equipped with a sub-chamber according to a first embodiment of the present invention includes a main chamber 100 that expands by being injected with gas in a collision, and a sub-chamber 500 that is formed by folding a panel-shaped chamber to be combined with the main chamber 100 and have self-supporting force, and assists supporting force of the main chamber 100 by expanding with the main chamber 100.

The airbag of various embodiments of the present invention is a front airbag and can be applied particularly to a driver seat or a front passenger seat of a vehicle. As shown in FIGS. 2 and 3, in the airbag of various embodiments of the present invention, the main chamber 100 has a 3-D shape composed of a front part 150 and side parts 130 and the sub-chamber 500 has a panel-shape formed of a front part 550 and a rear part 570 shown in FIG. 3.

By being injected with a gas from an inflator 300 in a collision, the main chamber 100 protects a passenger from injury by supporting the passenger and preventing him or her from hitting against a car body B, but when the passenger is turned to a corner in an oblique collision or an offset collision, the main chamber 100 collapses and cannot stably support the passenger. Accordingly, the panel-shaped sub-chamber 500 is folded to have self-supporting force and is coupled to the side parts 130 of the main chamber 100, whereby it is possible to more safely protect the passenger. This will be described in detail below.

The sub-chamber 500 has a 3D-shape and self-supporting force in accordance with a seam L formed by sewing a panel-shaped 2D chamber, a folded shape, and a coupled angle. In particular, when the sub-chamber 500 is coupled to the side parts 130 of the main chamber 100, it assists the main chamber 100 and increases the side-supporting force of the main chamber 100, thereby supporting a passenger turning in a collision and protecting the passenger from injury.

FIG. 1 shows a first embodiment of the present invention, in which the sub-chamber 500 is folded and coupled to the main chamber 100 and has an M-shape when completely expanding in a collision. Accordingly, as shown in FIG. 4, FIG. 5 and FIG. 6, the sub-chamber 500 has an M-shaped cross-section in accordance with the ways of sewing and folding. The sub-chamber 500 is a rectangle having a width larger than height and is formed of the front part 550 and the rear part 570. The front part 550 and the rear part 570 are sewn (L) at the upper and lower portions and have a plurality of vertical seams L having a predetermined length. Further, both sides and the center of the sub-chamber 500 are sewn (L) to sides of the main chamber 100, so the sub-chamber completely expands in an M-shape. This can be more clearly seen from FIG. 6.

The main chamber 100 and the sub-chamber 500 are provided with inflators 300 and 700, respectively, so the main chamber 100 and the sub-chamber 500 simultaneously expand to support a passenger by the inflators 300 and 700 in a collision. Alternatively, as shown in FIG. 4, only the main chamber 100 is provided with the inflator 300 and the sub-chamber 500 may not be provided with the inflator 700. In this case, vents 110 may be formed through a side of the main chamber 100 and gas injection holes 510 may be formed at positions corresponding to the vents 110 in the sub-chamber 500 so that when gas is injected into the main chamber 100 in a collision, gas is supplied into the sub-chamber 500 through the vents 110. The plurality of vents 110 and gas injection holes 510 may be formed with predetermined gaps. Accordingly, it is possible to increase the coverage of the airbag only with a minimal configuration. The configuration of the inflators 300 and 700 is well known in the art, so the detailed description is not provided.

The sub-chamber 500 may be coupled to the main chamber 100 at the same angle in the vertical direction, but the sub-chamber 500 is coupled to the main chamber 100 at a predetermined angle to be inclined so that the folded portion 530 of the sub-chamber 500 can more stably support a passenger by being in direct contact with the passenger's body.

Further, the sub-chamber 500 is formed to further protrude toward a passenger by a predetermined distance than protrude toward the main chamber 100 when the main chamber 100 and the sub-chamber 500 expand, thus the effect of forming a wall at the side parts 130 of the main chamber 100 can be achieved. Accordingly, it is possible to prevent a passenger from turning and hitting against the car body B and more stably support the passenger in a collision, whereby it is possible to protect the passenger from injury. Further, it supports the main chamber 100 such that the main chamber 100 does not collapse.

The sub-chamber 500 can be achieved in various shapes and second to sixth embodiments are shown in FIGS. 10 to 14. The embodiments will be checked and described with reference to the drawings.

Figure 10:
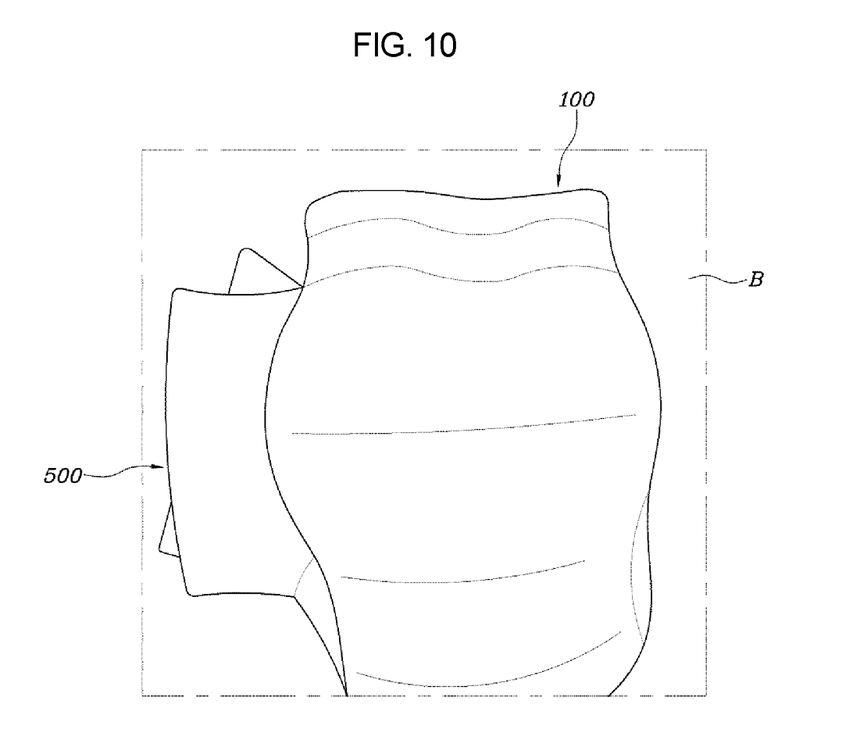
FIG. 10 is a view showing a second embodiment of the present invention.

FIG. 10 is a view showing the second embodiment of the present invention of which the coupling angle is different from that of the first embodiment shown in FIG. 1. In the following description, the first embodiment can be referred to as a normal M type and the second embodiment can be referred to as a parallel M type.

An M-shaped bottom is coupled to the side parts 130 of the main chamber 100. That is, the sub-chamber 500 is folded and coupled to the main chamber 100, and has a turned M-shape when completely expanding in a collision, in which both sides of the M are coupled to sides of the main chamber 100 and the bending portion of the M-shape faces the outside from the main chamber 100.

Figure 11:
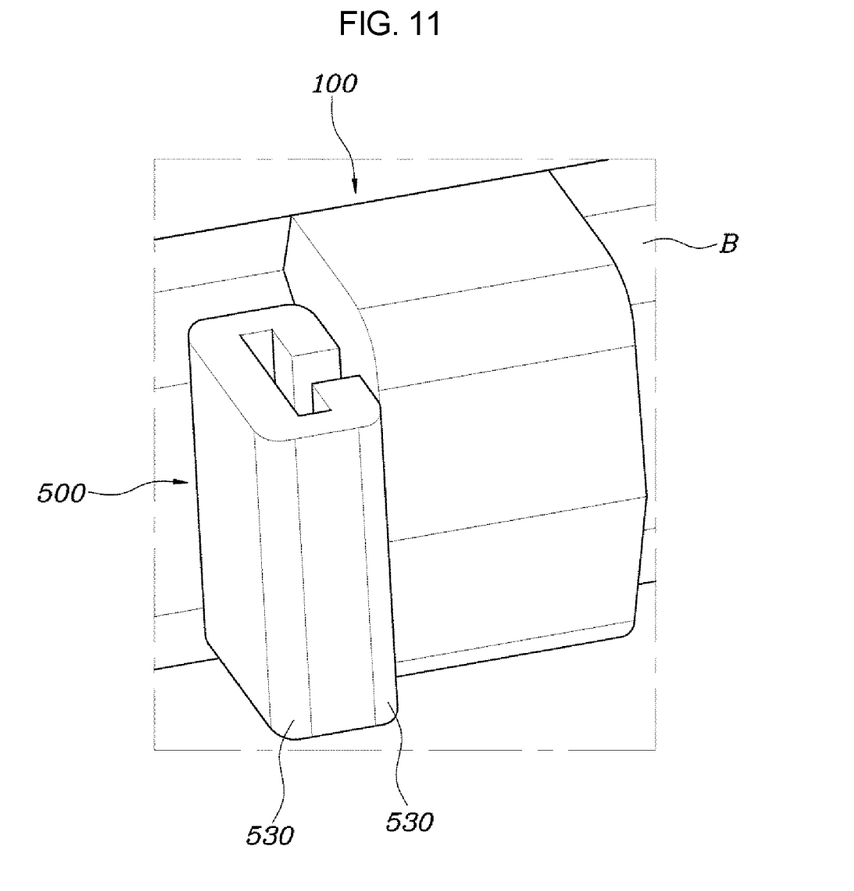
FIG. 11 is a view showing a third embodiment of the present invention.

FIG. 11 shows the third embodiment of the present invention, in which the sub-chamber 500 is folded and coupled to the main chamber 100 and has a C-shape when completely expanded in a collision. As shown in the figure, both ends of the C-shape are coupled to the main chamber 100, thereby ensuring self-supporting force, so it is possible to prevent a passenger from turning and hitting against the car body B in a collision. Further, it is possible to protect the passenger from injury by more stably supporting the passenger. Further, it supports the main chamber 100 such that the main chamber 100 does not collapse.

Figure 12:
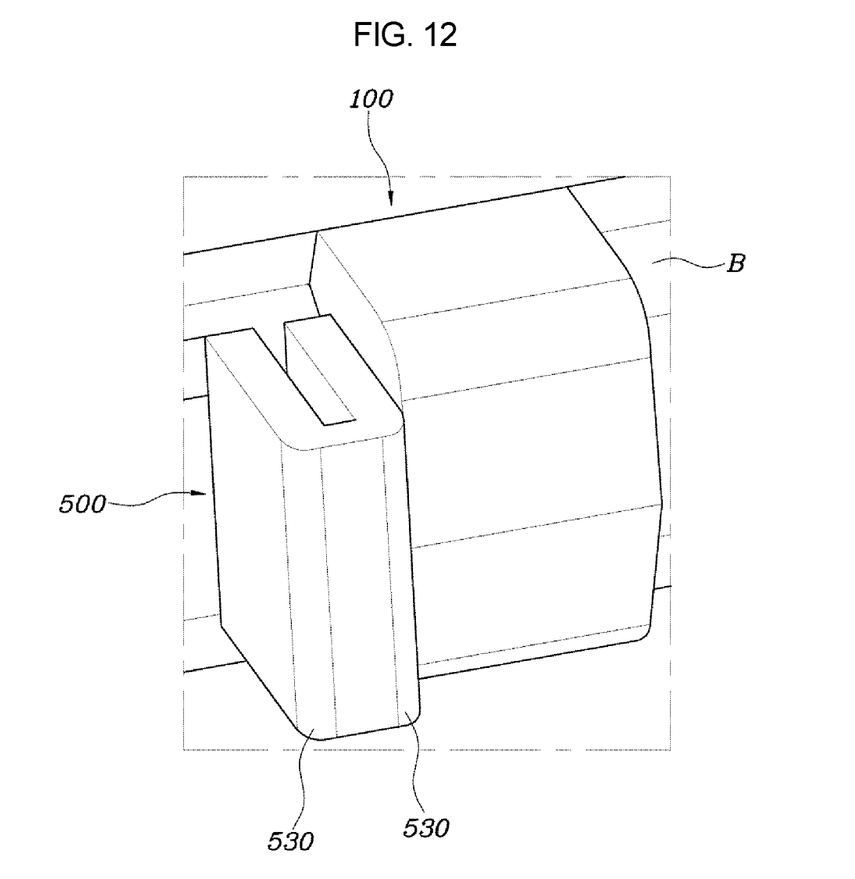
FIG. 12 is a view showing a fourth embodiment of the present invention.

FIG. 12 shows the fourth embodiment of the present invention, in which the sub-chamber 500 is folded and coupled to the main chamber 100 and has a U-shape when completely expanded in a collision. As shown in the figure, an end of the U-shape is coupled to the main chamber 100 and doubly supported with the other end, thereby ensuring self-supporting force, so it is possible to prevent a passenger from turning and hitting against the car body B in a collision. Further, it is possible to protect the passenger from injury by more stably supporting the passenger. Further, it supports the main chamber 100 such that the main chamber 100 does not collapse.

Figure 13:
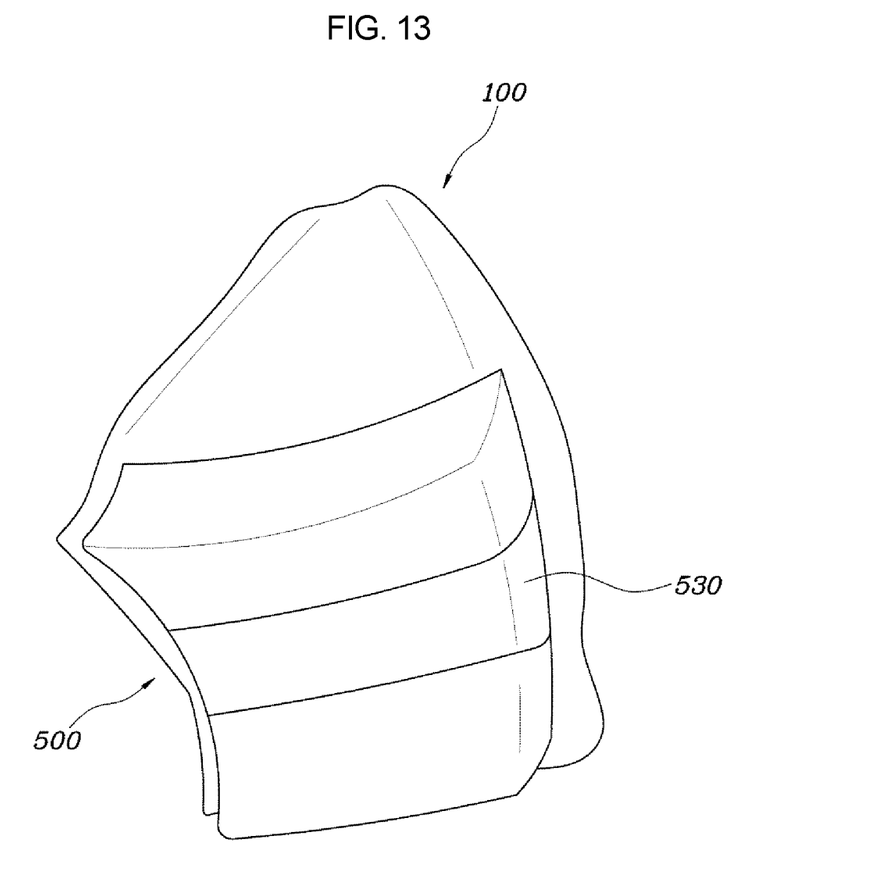
FIG. 13 is a view showing a fifth embodiment of the present invention.

FIG. 13 shows a fifth embodiment of the present invention, in which the sub-chamber 500 is formed in a rectangular shape. As described above, a rectangular column doubly ensures supporting force, thereby ensuring self-supporting force, so it is possible to prevent a passenger from turning and hitting against the car body B in a collision. Further, it is possible to protect the passenger from injury by more stably supporting the passenger. Further, it supports the main chamber 100 such that the main chamber 100 does not collapse.

Figure 14:
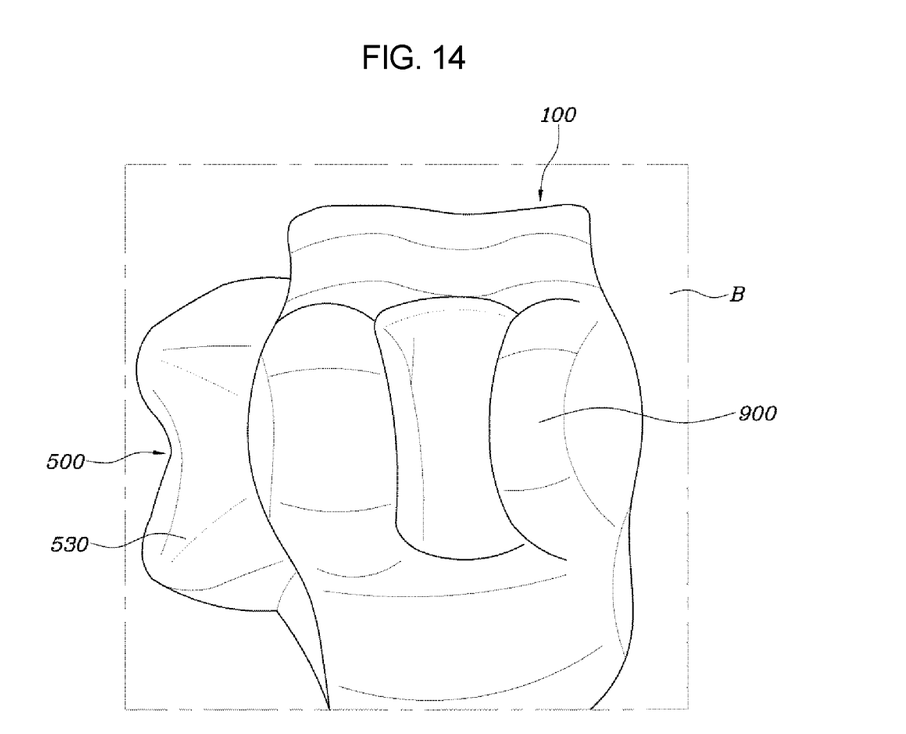
FIG. 14 is a view showing a sixth embodiment of the present invention.

FIG. 14 shows the sixth embodiment of the present invention, in which the sub-chamber 500 has an M-shape and a pair of head protection chambers 900 formed in the main chamber 100, the head protection chambers 900 protecting the head of a passenger. Accordingly, in the sixth embodiment shown in FIG. 14, since the head protection chambers 900 are provided rather than the sub-chamber 500, it is possible to more stably support a passenger. Further, the head protection chambers 900 may be provided in the first to fifth embodiments to more stably support the head of a passenger.

Accordingly, in the airbags equipped with a sub-chamber of various embodiments of the present invention, since the sub-chamber 500 is folded and coupled to the main chamber 100, it is possible to prevent collapse of the main chamber 100 and more effectively protect the head of a passenger. This effect has been experimentally proved and the results are shown in FIGS. 7 to 9.

Figure 7:
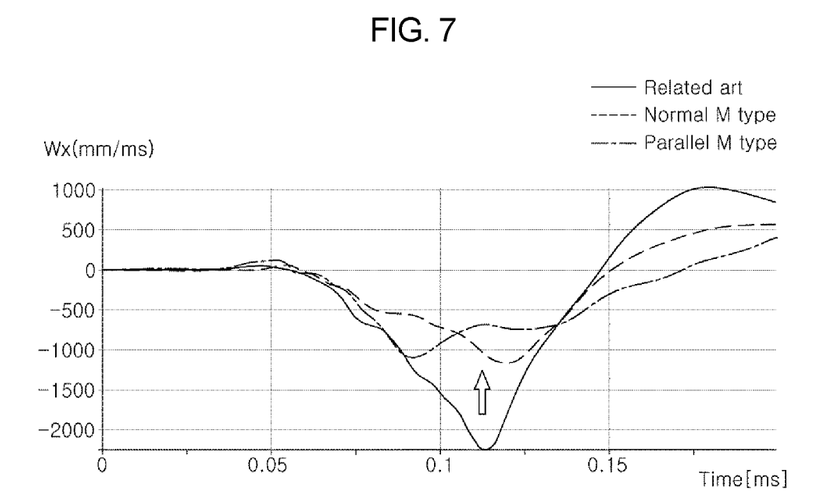
FIGS. 7 and 8 are graphs comparing rotational speeds of a head.
Figure 8:
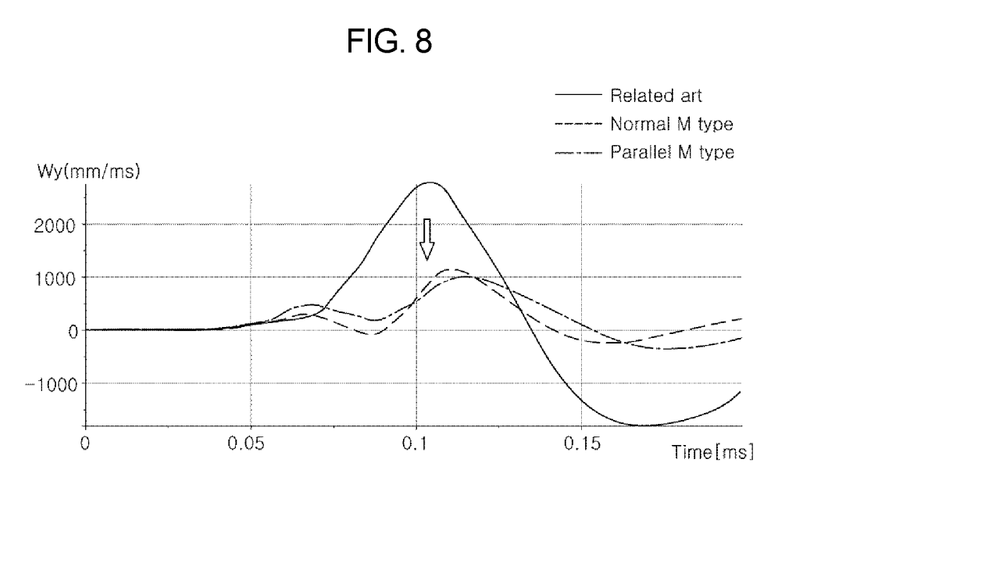
Figure 9:
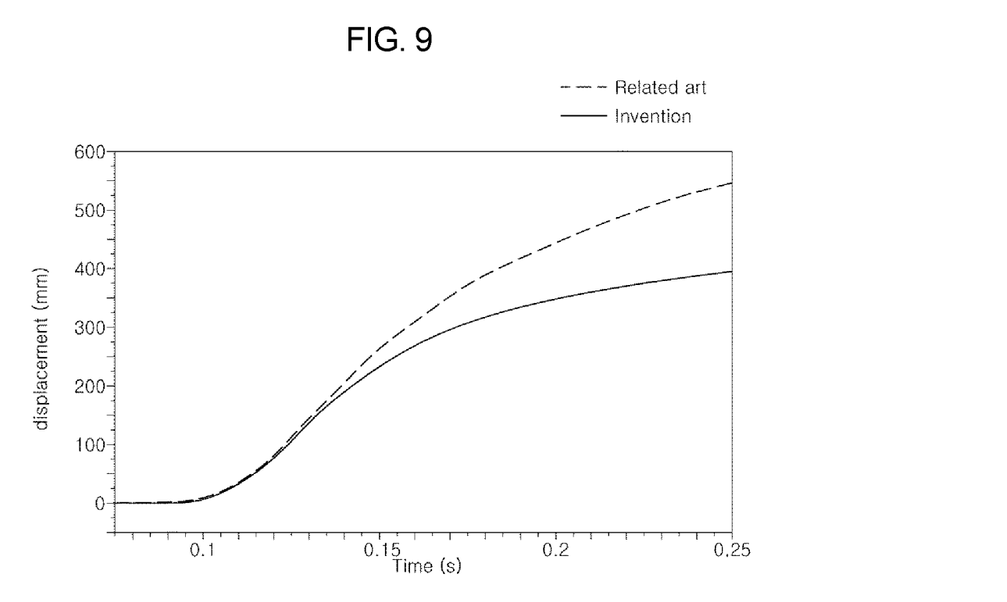
FIG. 9 is a graph showing the amounts of collapse.

FIGS. 7 and 8 are graphs comparing rotational speeds of a head in the related art and various embodiments of the present invention, and FIG. 9 is a graph comparing the amounts of collapse in the related art and various embodiments of the present invention. FIG. 7 is a graph showing the X-axial rotational speed of a head in a collision in the related art and in a case with the sub-chamber 500. When the sub-chamber 500 was applied, it was classified into the normal M type that is the first embodiment and the parallel M type that is the second embodiment. As can be seen from FIG. 7, the X-axial rotational speeds of the head were remarkably reduced in the normal M type that is the first embodiment and in the parallel M type that is the second embodiment, as compared with the related art.

FIG. 8 is a graph showing the Y-axial rotational speed of a head in a collision in the related art and in a case with the sub-chamber 500. Similarly, when the sub-chamber 500 was applied, it was classified into the normal M type that is the first embodiment and the parallel M type that is the second embodiment. As can be seen from FIG. 8, it can be seen that the Y-axial rotational speeds of the head were remarkably reduced in the normal M type that is the first embodiment and the parallel M type that is the second embodiment, as compared with the related art.

Finally, FIG. 9 is a graph showing the amounts of collapse of the main chamber in a collision in the related art and in a case with the sub-chamber 500. As can be seen from FIG. 9, it can be seen that the amount of collapse was reduced by about 150 mm in 0.25 seconds after the airbag expanded when various embodiments of the present invention were applied, as compared with the related art.

Therefore, according to the airbags equipped with a sub-chamber of various embodiments of the present invention, since a panel-shaped sub-chamber 500 is folded to have self-supporting force and is then coupled to the side parts 130 of the main chamber 100, it is possible to enlarge the coverage of the airbags with only the current inflator 300 even without increasing the volume of the main chamber 100.

In particular, even if a passenger is moved to a corner in an oblique or offset collision, the main chamber 100 does not collapse, so it is possible to more stably support the passenger.

Further, the panel-shaped chamber 500 can be achieved in various shapes in accordance with the ways of sewing and folding and the coupling angle, so it is possible to additionally ensure supporting force.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag equipped with a sub-chamber, comprising:
   a main chamber expanding by being injected with gas in a collision; and
   a sub-chamber formed by folding a panel-shaped chamber to be combined with the main chamber and have self-supporting force, the sub-chamber assisting supporting force of the main chamber by expanding with the main chamber,
   wherein the sub-chamber is folded and coupled to the main chamber and has an M-shape when completely expanded in the collision,
   wherein the sub-chamber is formed as a rectangle having a width larger than a height thereof and comprises a front part and a rear part,
   wherein the front part and the rear part are coupled at upper and lower portions thereof and include a plurality of vertical seams having a predetermined length, and
   wherein first and second sides and a center of the sub-chamber are coupled to sides of the main chamber.

2. The airbag of claim 1, wherein the sub-chamber is coupled to side parts of the main chamber to increase side supporting force of the main chamber and support a passenger turning in the collision.

3. The airbag of claim 1, wherein the main chamber and the sub-chamber each include an inflator, and the main chamber and the sub-chamber simultaneously expand via respective inflators and support a passenger in the collision.

4. The airbag of claim 1, wherein vents are formed through a side of the main chamber and gas injection holes are formed at positions corresponding to the vents in the sub-chamber, gas is supplied into the sub-chamber through the vents when gas is injected into the main chamber, the gas is supplied into the sub-chamber through the vents.

5. The airbag of claim 1, wherein the sub-chamber is coupled to the main chamber to turn at a predetermined angle with respect to the main chamber so that a folded portion of the sub-chamber supports a passenger.

6. The airbag of claim 1, wherein the sub-chamber is folded and coupled to the main chamber, has the M-shape when completely expanded in the collision, both ends of the M-shape are coupled to a side part of the main chamber, and a bending portion of the M-shape faces outside from the main chamber.

7. The airbag of claim 1, wherein the sub-chamber is folded and coupled to the main chamber and has a C-shaped cross-section cut in a width direction of a vehicle, and at least one folded part of the sub-chamber is protruded toward a passenger when completely expanded in the collision.

8. The airbag of claim 1, wherein the sub-chamber is folded and coupled to the main chamber and has a U-shaped cross-section cut in a width direction of a vehicle, and at least one folded part of the sub-chamber is protruded toward a passenger when completely expanded in the collision.

9. The airbag of claim 1, wherein the sub-chamber is coupled to the main chamber to further protrude by a predetermined distance toward a passenger than toward the main chamber when the main chamber and the sub-chamber expand.

10. The airbag of claim 1, wherein a pair of head protection chambers for protecting a head of a passenger is formed in the main chamber.

11. The airbag of claim 1 wherein the center of the sub-chamber is directly coupled to one of the sides of the main chamber by the vertical seams.

* * * * *